(12) United States Patent
Edwards

(10) Patent No.: US 8,277,708 B2
(45) Date of Patent: Oct. 2, 2012

(54) COMPRESSION MOLDING THICKNESS REGULATOR

(75) Inventor: David Edwards, Marysville, OH (US)

(73) Assignee: Honda Motor Co., Ltd., Tokyo (JP)

(*) Notice: Subject to any disclaimer, the term of this patent is extended or adjusted under 35 U.S.C. 154(b) by 204 days.

(21) Appl. No.: 12/612,771

(22) Filed: Nov. 5, 2009

(65) Prior Publication Data
US 2011/0104320 A1 May 5, 2011

(51) Int. Cl.
*B29C 43/54* (2006.01)
*B29C 43/58* (2006.01)

(52) U.S. Cl. ........ 264/154; 264/156; 425/193; 425/394; 425/470

(58) Field of Classification Search .......... 425/140–141, 425/150, 352–355, 385, 444, 468–469, 78, 425/405.1–405.2, 193, 394, 470; 264/671, 264/678, 512, 544, 153–156
See application file for complete search history.

(56) References Cited

U.S. PATENT DOCUMENTS

| | | | |
|---|---|---|---|
| 3,244,780 A * | 4/1966 | Levey et al. ................ | 425/388 |
| 3,664,784 A * | 5/1972 | Sibley ......................... | 425/78 |
| 4,584,823 A * | 4/1986 | Nagel ......................... | 425/524 |
| 4,836,960 A | 6/1989 | Spector et al. | |
| 6,113,378 A * | 9/2000 | Tsuboi et al. ............... | 425/352 |
| 6,290,202 B1 | 9/2001 | Rindoks et al. | |
| 6,799,958 B2 | 10/2004 | Kato et al. | |
| 6,921,503 B1 | 7/2005 | Sherwood | |
| 7,033,156 B2 * | 4/2006 | Gakovic ..................... | 425/352 |
| 7,214,046 B2 * | 5/2007 | Gakovic ..................... | 425/78 |
| 2008/0067704 A1 | 3/2008 | Ohmori et al. | |

FOREIGN PATENT DOCUMENTS

| | | |
|---|---|---|
| JP | 03-292119 | * 12/1991 |
| JP | 07-124973 | 5/1995 |
| WO | WO/2006/041781 | 4/2006 |

* cited by examiner

*Primary Examiner* — Richard Crispino
*Assistant Examiner* — Thukhanh Nguyen
(74) *Attorney, Agent, or Firm* — Clifford B. Vaterlaus, Esq.; Emerson Thomson Bennett

(57) ABSTRACT

Some embodiments comprise a mechanical thickness regulator for a compression mold, or related systems and/or methods. A regulator can include a thickness regulator pin received by a recess in an extendable and retractable relation. The regulator pin can include a tip, or can be contacted with a tip, defining a predetermined distance from the pin to the end of the tip, the distance defining a gap of well known dimensions for receiving and molding polymer melt.

20 Claims, 2 Drawing Sheets

COMPRESSION MOLDING THICKNESS REGULATOR

I. BACKGROUND OF THE INVENTION

A. Field of Invention

This invention generally relates to devices, systems and methods for controlling the thickness of a compression molded part.

B. Description of the Related Art

Compression molding is known in the art. Furthermore, it is known to control the thickness of compression molded parts. One method for controlling thickness includes regulating the amount of polymer charge, e.g. according to weight or volume. For example, a thinner part can result from charging the compression mold with less polymer. Another method is to incorporate mechanical stops into the compression mold. One problem with the known devices and methods for controlling thickness is that the mold may flex or otherwise deform under operating pressures and/or temperatures. This results in some portions of the product being thinner than specified while others are thicker than specified.

The present invention provides devices, systems, and/or methods that differ from the prior art. Furthermore, some embodiments may overcome one or more of the foregoing disadvantages of the known art.

II. SUMMARY OF THE INVENTION

Some embodiments of the present invention relate to a mechanical thickness regulator for a compression mold, comprising: a recess in a compression mold surface adapted to receive a thickness regulator pin; a thickness regulator pin received by the recess in an extendable and retractable relation; a biasing means maintaining the thickness regulator pin in a static contacting relation to the recess; a cavity-end face defined by an end of the thickness regulator pin facing the cavity of the compression mold; and a tip integrally or fixedly disposed on the cavity-end face, the tip defining a predetermined distance from the cavity-end face to the end of the tip, the tip being adapted to contact an opposing face of the compression mold.

Other embodiments relate to a mechanical thickness regulator for a compression mold, comprising: a recess in a compression molding surface, the recess defining a volume and having a receiving portion, the receiving portion defining a first diameter and a end wall, and a retaining portion defining a second diameter, the second diameter further defining an aperture allowing communication between the recess volume and the compression molding surface; a thickness regulator pin defining a longitudinal axis having a cavity end and a recess end and oriented generally toward a compression mold surface, and the pin further including a first portion defining a first diameter, and comprising a radially extending flange defining a major diameter, the major diameter being less than the receiving portion diameter, and greater than the retaining portion diameter, thereby adapting the pin to be retained by the retaining portion; a tip comprising a thickness-limiting portion of the pin protruding from the aperture into a mold cavity and adapted to abut an opposing compression mold surface thereby limiting the minimum distance between mold surfaces; and a biasing means maintaining the thickness regulator pin in a static contacting relation to the recess, wherein the mechanical thickness regulator is disposed at one or more predetermined points in a compression mold.

Other embodiments relate to a mechanical thickness regulator for a compression mold, comprising: a recess in a compression mold surface adapted to receive a thickness regulator pin; a thickness regulator pin received by the recess in an extendable and retractable relation; a biasing means maintaining the thickness regulator pin in a static contacting relation to the recess; a cavity-end face defined by an end of the thickness regulator pin facing the cavity of the compression mold; and a tip integrally or fixedly disposed on a mold surface opposing the cavity end face of the thickness regulator pin, the tip defining a predetermined distance from the cavity-end face to the end of the tip, the tip being adapted to be brought into contact with the cavity-end face.

Still other embodiments relate to a system for controlling the thickness of a portion of a compression molded part comprising one or more devices according to either of the preceding paragraphs disposed at predetermined locations in a compression mold.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
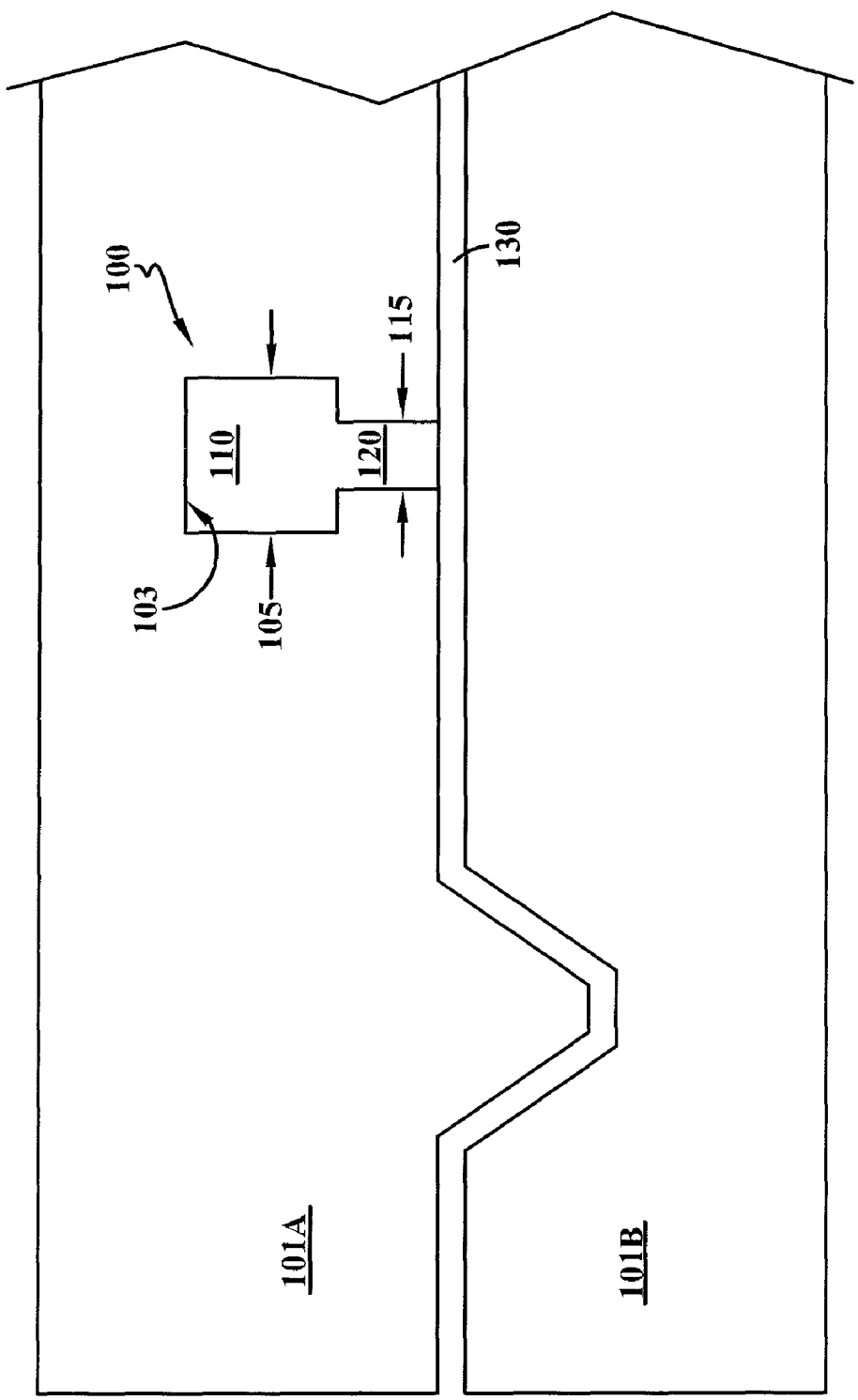
FIG. 1 is a cross sectional view of a compression mold including portions of an embodiment.

Embodiments generally relate to devices and methods for mechanically regulating the thickness of compression molded parts. According to some embodiments, a mechanical thickness regulator can comprise a recess in a compression mold surface. The recess can receive a thickness regulator pin having a tip. The pin can be biased, for instance, with a spring, toward the mold surface and a portion of the pin can protrude from the recess. Therefore, when the compression mold halves are assembled, a portion of the pin extends into the mold cavity and the tip can contact an opposing compression mold surface. The combination of the pin, tip and recess is adapted to form a controlled predetermined thickness in a molded part at least in the vicinity of the tip.

According to some embodiments a recess of a mechanical thickness regulator for a compression mold can comprise a volume located in a predetermined position on a mold surface. One of skill in the art will recognize that the specific location will coincide with a region where enhanced dimensional accuracy and/or precision are necessary. For instance, such a location can include material surrounding a throughhole for receiving a fastener.

According to some embodiments the dimensions of the recess, pin and tip are known to a level of precession at least equal to that which is desired in the molded part. In other embodiments the dimensions of the recess, pin and tip can be known to a greater level of precision, such as an order of magnitude greater, or more. Suitable recesses can comprise a cylindrical shape defining a first diameter and having an end wall approximately perpendicular to the diameter. The first diameter and end wall can define a receiving portion, adapted to receive a portion of a thickness regulator pin. An opposing end of the recess can define a second diameter that is less than the first diameter, and can further define an aperture connecting the receiving portion and the mold cavity. Therefore, according to some embodiments the receiving portion can communicate with the mold cavity. One of skill in the art will recognize that the receiving portion and aperture can comprise a wide variety of geometric shapes and dimensions, and are not limited to cylindrical shapes or particular dimensions.

According to some embodiments, a thickness regulator pin can define a generally cylindrical shape having a recess end and a cavity end. The pin can further include a flange member bisecting the pin at a predetermined location between the two ends. Accordingly, the pin can define a first diameter extending from the recess end to the flange, and a second diameter extending from the flange to the cavity end. In general, the first diameter of the pin must be smaller than the diameter of the receiving portion of the recess, inasmuch as it must slideably fit within the receiving portion. Similarly, the second diameter of the thickness regulator pin is smaller than the second diameter of the recess, which defines the recess aperture. Thus, the second diameter of the pin slideably fits within the aperture. The flange can be smaller than the first diameter of the recess and larger than the second diameter of the recess. Therefore, the flange is adapted to be retained by the aperture.

The cavity end of the thickness regulator pin can comprise a face. The face can comprise any of a wide variety of geometric shapes depending on the shape of the desired molded product. For instance, if the thickness-controlled region of the molded part comprises a through-hole for receiving a fastener then the face may be generally flat and parallel to the opposing surface of the mold. Similarly, if the fastener is to be countersunk then the face may have a conical shape. Still other desired shapes can include flat, conical, spherical, ellipsoidal, notched, grooved, contoured, corrugated, and the like. One of skill in the art will be able to select a desirable shape without undue experimentation.

A thickness regulator pin can additionally include a tip disposed at the cavity-end face of the pin. According to some embodiments the tip can be smaller than the second diameter of the pin, and can be centered on the cavity-end face of the pin. Additionally, in some embodiments the tip can comprise a shape suitable for forming a through-hole in a molded part, wherein the through-hole is suitable for receiving a fastener. Furthermore, according to some embodiments the tip can contact an opposing compression mold surface thereby defining a gap between the opposing surface and the cavity end face of the pin. Still further, the gap can comprise well-defined dimensions, and is therefore adapted to more tightly control the thickness of the compression molded part in the vicinity of the gap. For example, one or more of the mold surfaces may bow or otherwise deform during the molding process. The thickness regulator pin can compensate for such deformations by extending further outward from, or inward into, the recess thereby maintaining contact with the opposing mold surface, and preserving the desired thickness. In some embodiments the tip may be an integral part of the thickness regulator pin, such as by lathing the tip from an end portion of the pin. Alternatively, the tip may be fixedly attached to the pin. Means for fixedly attaching can include male/female threads, welding, brazing, and the like. One of skill in the art will recognize that a wide variety of acceptable means are known and can be selected without undue experimentation.

A biasing means can comprise any of a wide variety of devices including springs, such as coil springs, leaf springs, hydraulic drives, and/or pneumatic drives. According to some embodiments, a coil spring can have one end in contact with the end wall of the recess, and the other end in contact with flange of the thickness regulator pin. In other embodiments, a leaf spring can be disposed between the end wall of the recess and the recess end of the pin. Furthermore, according to some embodiments the spring can remain partially compressed when the pin is at the fully extended end of its range of motion. Suitable biasing means are adapted to apply sufficient force to the thickness regulator pin to overcome the pressure exerted on the pin by a polymer melt.

Referring now to the drawings wherein the showings are for purposes of illustrating embodiments of the invention only and not for purposes of limiting the same, FIG. 1 is a drawing of top 101A and bottom 101B elements of a compression mold, wherein the top element 101A includes a recess 100. The recess 100 has a first diameter 105 and an end wall 103 defining a receiving portion 110. The recess 100 further includes a second diameter 115 defining an aperture 120. The aperture 120 allows the receiving portion 110 of the recess 100 to communicate with the mold cavity 130.

Figure 2:
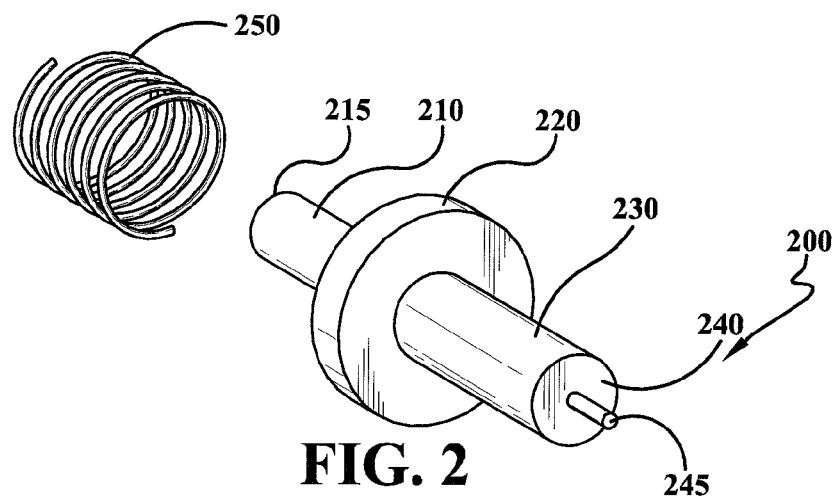
FIG. 2 is an exploded perspective view of a spring and thickness regulation pin according to an embodiment.

FIG. 2 is an exploded view drawing of an embodiment comprising a thickness regulation pin 200 and spring 250. The pin 200 includes first portion 210 defining a first diameter and a recess end 215, which are adapted to fit within the receiving portion 110 of the recess 100. The pin 200 further includes a second portion 230 defining a second diameter, which is smaller than the diameter of the aperture 120. According to FIG. 2, the second diameter is greater than the first diameter; however, this is only one of a variety of suitable arrangements. Further according to FIG. 2, the first 210 and second 230 portions are separated by a flange 220, which bisects the pin 200 in a generally perpendicular orientation. The flange 220 also defines a diameter, and fits within the receiving portion 110, but is too large to fit through the aperture 120. Accordingly, the pin 200 is adapted to be retained by the recess 100. More specifically, the flange 220 abuts and is retained by a ledge 122. The pin 200 further includes a cavity end defining a face 240. In FIG. 2 the face 240 is shown generally flat. A tip 245 is located in a central position on the face 240. In an alternative embodiment, the tip 245 is separate from the face 240, and is instead attached to bottom element 101B. Thus, when the mold is assembled, the tip 245 and face 240 come into contact and define a minimum spacing.

Figure 3:
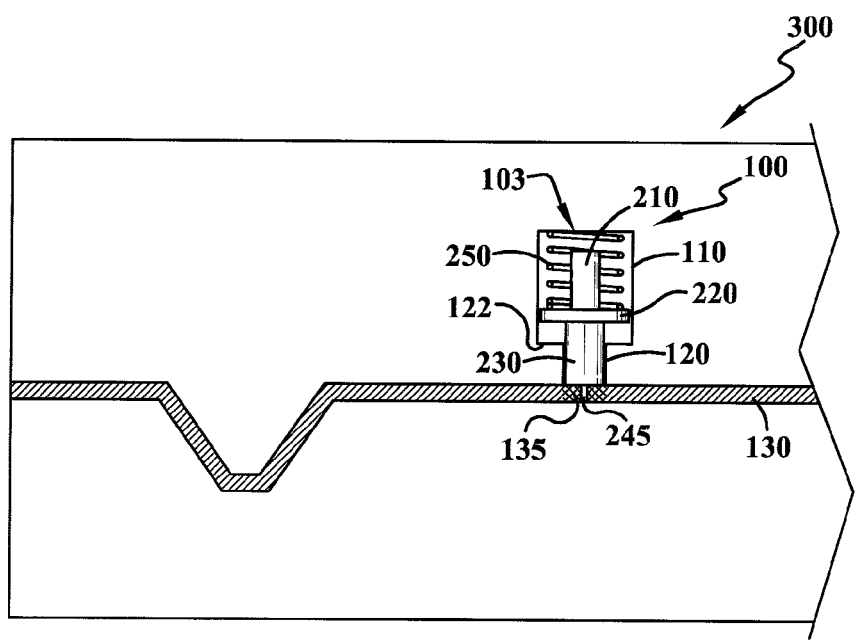
FIG. 3 is an assembly according to an embodiment including the elements of FIG. 1 and FIG. 2.
Figure 4:
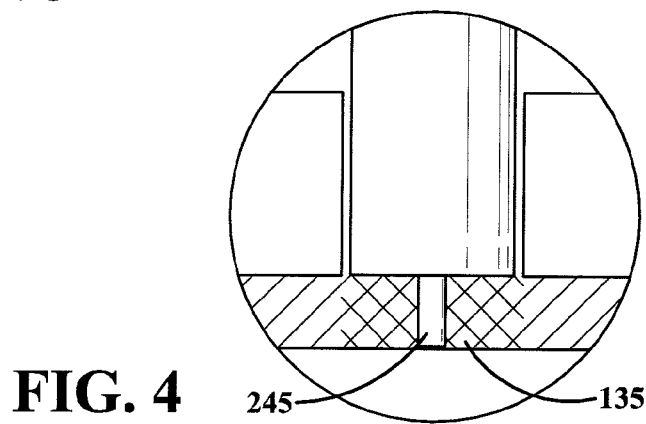
FIG. 4 is a magnified view of the tip shown in FIG. 3.

FIG. 3 shows an embodiment 300 disposed in a compression mold. According to FIG. 3, the cavity-end face 240 of the pin 200 faces an opposing mold surface, and the tip 245 contacts the opposing surface. Therefore a gap 135 is formed having well known dimensions. Accordingly, the thickness of a molded part is controlled in the vicinity of the gap 135. Moreover, if one or more portions of the compression mold deforms, the pin 200 is adapted to extend or compress by the action of a coil spring 250, thereby maintaining a gap 135 having constant dimensions. Thus, even if the rest of the mold deforms, the thickness-critical portions of the mold remain constant. FIG. 4 is a magnified view of the tip 245 and gap 135 shown in FIG. 3.

Although the drawings herein show a thickness regulator disposed in a top element 101A and opposing a bottom element 101B, one skilled in the art will recognize that a regulator could alternatively be disposed in the bottom element 101B and oppose the top element 101A. Furthermore, some embodiments can include compression molds having, in a single mold, thick regulators disposed in both a top element 101A and a bottom element 101B. For example, at some points within a mold it may be advantageous to orient a thickness regulator in opposition to a top element 101A, while at other points within the same mold it may be advantageous to orient a thickness regulator in opposition to a bottom element 101B.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

I claim:

1. A mechanical thickness regulator for a compression mold having first and second elements and defining a compression mold cavity therebetween, the first element having a recess that communicates with the compression mold cavity, the mechanical thickness regulator comprising:
   a thickness regulator pin positioned within the recess of the first element of the compression mold, the thickness regulator pin having a cavity end face that is extended toward the compression mold cavity to define a surface of the compression mold cavity;
   a biasing means positioned within the recess of the first element of the compression mold that causes the thickness regulator pin to extend;
   a tip that has a first end that contacts the cavity end face of the thickness regulator pin and a second end that contacts a cavity surface of the second element of the compression mold; and,
   wherein the tip maintains a constant distance between the cavity end face of the thickness regulator pin and the cavity surface of the second element of the compression mold to control the thickness between the end face of the thickness regulator pin and the cavity surface of the second element of the compression mold of an associated part compression molded in the compression mold cavity.

2. The mechanical thickness regulator of claim 1 wherein the first end of the tip is attached to the cavity end face of the thickness regulator pin.

3. The mechanical thickness regulator of claim 1 wherein the second end of the tip is attached to the cavity surface of the second element of the compression mold.

4. The mechanical thickness regulator of claim 1 wherein the tip is replaceable.

5. The mechanical thickness regulator of claim 1 wherein the thickness regulator pin is oriented such that its longitudinal axis is generally perpendicular to the cavity surface of the second element of the compression mold.

6. The mechanical thickness regulator of claim 5, wherein the pin comprises: a first portion defining a first diameter; a second portion defining a second diameter; and, and a radially extending flange that separates the first and second portions.

7. The mechanical thickness regulator of claim 1 wherein the cavity end face comprises a topology selected from at least one of flat, conical, spherical, ellipsoidal, notched, grooved, contoured, and corrugated.

8. The mechanical thickness regulator of claim 1 wherein the tip is fixedly attached to the cavity end face by one of male/female threads, welding, and brazing.

9. A compression mold comprising:
   a first mold element comprising a recess;
   a second mold element that with the first mold element defines a compression mold cavity therebetween, the recess communicating with the compression mold cavity;
   a thickness regulator for a compression mold having first and second elements and defining a compression mold cavity therebetween, the first element having a recess that communicates with the compression mold cavity, the mechanical thickness regulator comprising:
   a thickness regulator pin positioned within the recess of the first element of the compression mold, the thickness regulator pin having a cavity end face that is extended toward the compression mold cavity to define a surface of the compression mold cavity;
   a biasing means positioned within the recess of the first element of the compression mold that causes the thickness regulator pin to extend;
   a tip that has a first end that contacts the cavity end face of the thickness regulator pin and a second end that contacts a cavity surface of the second element of the compression mold; and,
   wherein the tip maintains a constant distance between the cavity end face of the thickness regulator pin and the cavity surface of the second element of the compression mold to control the thickness between the end face of the thickness regulator pin and the cavity surface of the second element of the compression mold of an associated part compression molded in the compression mold cavity.

10. The mechanical thickness regulator of claim 9 wherein the first end of the tip is attached to the cavity end face of the thickness regulator pin.

11. The mechanical thickness regulator of claim 9 wherein the second end of the tip is attached to the cavity surface of the second element of the compression mold.

12. The mechanical thickness regulator of claim 9 wherein the tip is replaceable.

13. The mechanical thickness regulator of claim 9, wherein the pin comprises: a first portion defining a first diameter; a second portion defining a second diameter; and, and a radially extending flange that separates the first and second portions.

14. The mechanical thickness regulator of claim 9 wherein:
   the first mold element is a top mold element; and,
   the second mold element is a bottom mold element.

15. The mechanical thickness regulator of claim 9 wherein:
   the first mold element is a bottom mold element; and,
   the second mold element is a top mold element.

16. A method comprising the steps of:
   (A) providing a compression mold having first and second elements and defining a compression mold cavity therebetween, the first element having a recess that communicates with the compression mold cavity;
   (B) providing a mechanical thickness regulator comprising: (1) a thickness regulator pin positioned within the recess of the first element of the compression mold, the thickness regulator pin having a cavity end face that is extended toward the compression mold cavity to define a surface of the compression mold cavity; (2) a biasing means positioned within the recess of the first element of the compression mold that causes the thickness regulator pin to extend; and, (3) a tip having first and second ends;
   (C) positioning the tip with the first end contacting the cavity end face of the thickness regulator pin and the second end contacting a cavity surface of the second element of the compression mold;
   (D) molding a compression molded part with the compression mold; and,
   wherein step (D) comprises the step of: using the tip to maintain a constant distance between the cavity end face of the thickness regulator pin and the cavity surface of the second element of the compression mold to control the thickness between the end face of the thickness regulator pin and the cavity surface of the second element of the compression molded part.

17. The method of claim 16 wherein step (A) comprises the step of:
   positioning the recess to coincide with a region of the compression molded part that requires thickness control.

18. The method of claim 16 wherein:
   step (B) comprises the step of: forming the tip to have predetermined shape; and,
   step (D) comprises the step of: forming a through-hole in the compression molded part with the tip.

19. The method of claim 16 wherein step (D) comprises the steps of:
   deforming the compression mold; and,
   using the biasing means to cause the thickness regulator pin to extend to compensate for the deformation.

20. The method of claim 16 wherein after step (D) the method comprises the step of:
   replacing the tip.

* * * * *